United States Patent [19]

Minegishi et al.

[11] Patent Number: 5,149,567
[45] Date of Patent: Sep. 22, 1992

[54] CUSHION AND METHOD OF MANUFACTURING THE SAME

[75] Inventors: Takeshi Minegishi, Sagamihara; Yasuo Yoneshige, Kawasaki; Toshihiro Takehana, Yokohama; Toru Sakai, Tokyo, all of Japan

[73] Assignee: NHK Spring Co., Ltd., Yokohama, Japan

[21] Appl. No.: 480,559

[22] Filed: Feb. 15, 1990

Related U.S. Application Data

[60] Division of Ser. No. 77,041, Jul. 16, 1987, Pat. No. 4,902,542, which is a continuation-in-part of Ser. No. 811,521, Dec. 20, 1985, abandoned.

[30] Foreign Application Priority Data

Dec. 28, 1984 [JP] Japan ................................ 59-281080

[51] Int. Cl.$^5$ ............................................ B05D 3/12
[52] U.S. Cl. ................................. 427/240; 427/389.9; 427/393.3
[58] Field of Search ............................ 5/474, 448, 482; 264/258; 427/389.9, 393.3, 240; 428/198, 224, 229, 290, 297, 299, 300, 369, 420, 423.1

[56] References Cited

U.S. PATENT DOCUMENTS 4,172,174 10/1974 Takagi ................................. 428/300
4,563,387 1/1986 Takagi et al. ........................ 428/300

OTHER PUBLICATIONS

Fischer–Bobsien International Encyclopedia of Textiles 1966, columns 1595 and 1605.

Primary Examiner—Michael Lusignan
Attorney, Agent, or Firm—Frishauf, Holtz, Goodman & Woodward

[57] ABSTRACT

A method of manufacturing a cushion, by impregnating a main body comprising organic synthetic fibers which are stereoscopically intertwined with a polyurethane prepolymer solution so as to allow the polyurethane prepolymer to attach the prepolymer to the fibers, subjecting the cushion body to centrifugation to remove excess solution from the cushion body, and bringing the polyurethane prepolymer attached to the fibers into contact with a curing agent comprising water so as to cure the polyurethane prepolymer.

20 Claims, 8 Drawing Sheets

F I G. 4
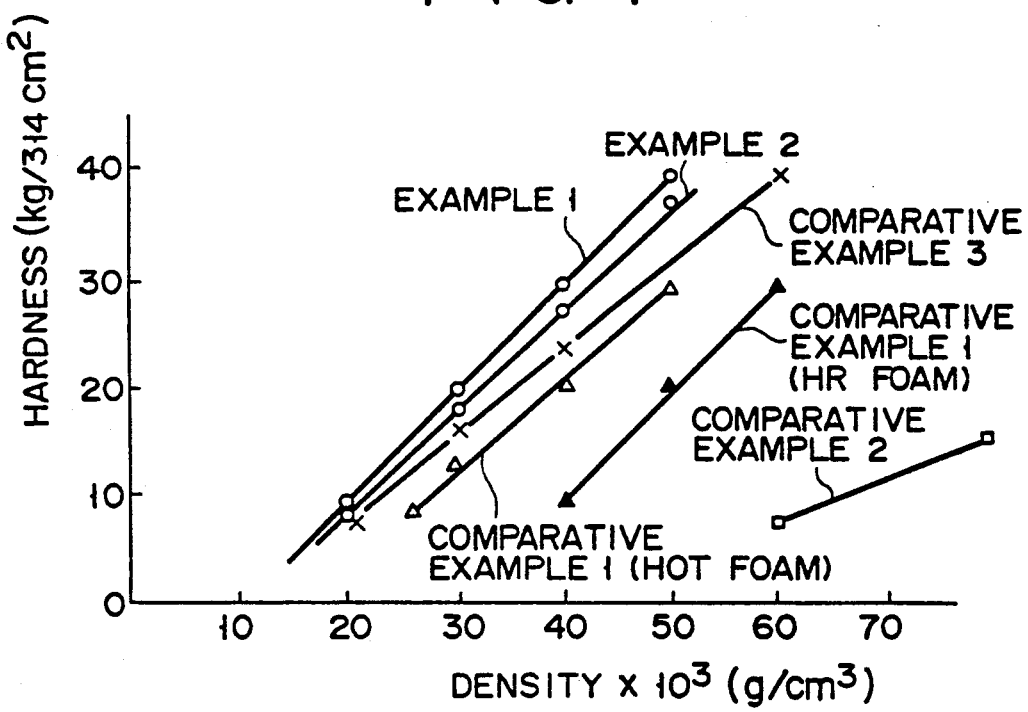
F I G. 5
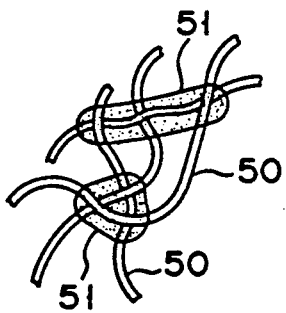
F I G. 6
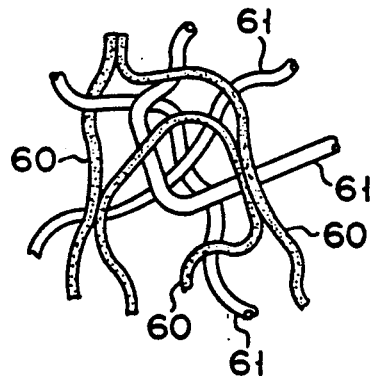

CUSHION AND METHOD OF MANUFACTURING THE SAME

This application is a divisional application of Ser. No. 07/077,041 filed Jul. 16, 1987 now U.S. Pat. No. 4,902,542, which is a continuation-in-part application of Ser. No. 06/811,521 filed Dec. 20, 1985 (now abandoned).

BACKGROUND OF THE INVENTION

1. Field of the Invention

The present invention relates to a cushion used for seats in vehicles such as automobiles or aircraft and to a method of manufacturing such a cushion.

2. Description of the Prior Art

Various materials are used for conventional cushions for seats used in vehicles such as automobiles or aircraft. Examples of such materials include palmrock, using palm fibers, a synthetic resin foam such as a polyurethane foam, or a cotton-like material of organic synthetic fibers.

Palmrock, however, has a large specific gravity and easily collapses.

Polyurethane foam has poor air permeability and cannot provide a comfortable cushion. High-resiliency polyurethane foams considered to provide more comfort have larger specific gravities than flexible polyurethane foams.

A cotton-like material consisting of organic synthetic fibers easily collapses, so it is not suitable for use in a cushion either.

SUMMARY OF THE INVENTION

It is, therefore, an object of the present invention to provide a cushion which can maintain an excellent cushioning effect over a relatively long period of time and which has a small specific gravity and excellent air permeability, and to provide a method of manufacturing such a cushion.

In order to achieve the above object of the present invention, there is provided a cushion comprising a cushion main body comprising organic synthetic fibers having a denier of 1 to 20 which are stereoscopically intertwined, and a cured polyurethane resin which binds the fibers at their intersections.

The cushion according to the present invention can be manufactured in the following manner. A cushion main body comprising organic synthetic fibers having a denier of 1 to 20 which are stereoscopically intertwined is impregnated with a polyurethane prepolymer solution so as to allow the prepolymer to attach itself to the surfaces of the fibers. The cushion body is then subjected to centrifugation to remove excess solution from the cushion body. The prepolymer is then brought into contact with a curing agent comprising water and is cured, thereby bonding the fibers at their intersections.

BRIEF DESCRIPTION OF THE DRAWINGS

FIG. 4 is a graph showing the relationship between hardness and density in cushions in the Examples together with cushions in the Comparative Examples; and FIGS. 5 and 6 are illustrations for explaining the structures of the cushions in the Comparative Examples.

DETAILED DESCRIPTION OF THE PREFERRED EMBODIMENTS

A cushion according to the present invention will be described with reference to the accompanying drawings.

Figure 1:
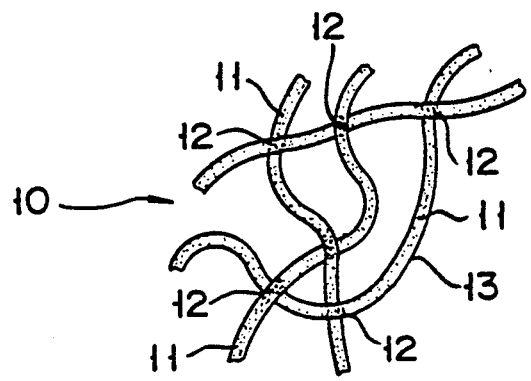
FIG. 1 is an illustration for explaining the structure of a cushion according to the present invention.
Figure 2:
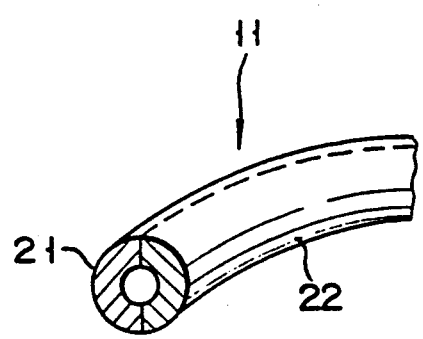
FIG. 2 is a perspective view showing an example of an organic synthetic fiber used in the cushion according to the present invention.
Figure 3:
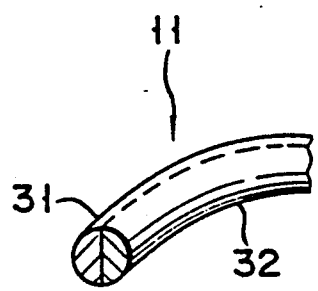
FIG. 3 is a perspective view showing another example of an organic synthetic fiber used in the cushion according to the present invention.

Referring to FIG. 1, a cushion according to the present invention comprises main body 10, comprising organic synthetic fibers 11 which are stereoscopically intertwined. Main body 10 has a cotton-like structure, and fibers 11 have a relatively large number of intersections 12. The organic synthetic fibers can consist of, for example, polyester fiber, nylon fiber, acrylic fiber or polypropylene fiber. The cross-sectional shape of the fiber to be used is not critical. Thus, a fiber having circular or profile cross-sections can be used. The fibers can be hollow or solid. Hollow fibers are preferred because they reduce the weight of the cushion product. Furthermore, each fiber can be made of a single material or a plurality of materials. The organic synthetic fiber illustrated in FIG. 2 is a hollow fiber of the so-called conjugated type and is obtained by combining two fiber materials 21 and 22 having different thermal shrinkage coefficients. The fiber illustrated in FIG. 3 is a solid fiber of the conjugated type, and is obtained by combining two fiber materials 31 and 32 having different thermal shrinkage coefficients. The fibers must have a denier of 1 to 20, and preferably have a length of 25 to 150 mm. If the denier is over 20, the degree of intertwining of the fibers are poor, and the intertwined fibers tend to loosen or come untied.

Main body 10 can also contain inorganic fibers such as metal or glass fibers in addition to organic synthetic fibers. When inorganic fibers are used, they must be included in an amount of 5 to 90% by weight based on the total weight of main body 10.

Main body 10 normally has a density of 0.01 to 0.1 g/cm$^3$ and preferably has a density of 0.015 to 0.060 g/cm$^3$. Such a main body is obtained by intertwining fibers at a crimping density of 5 to 20 fibers per inch.

As shown in FIG. 1, fibers 11 of main body 10 are uniformly and thinly coated with cured polyurethane resin 13, which firmly binds fibers 11 at their intersections 12.

Cured polyurethane resin 13 is obtained by curing a polyurethane prepolymer with water including steam. Any polyurethane prepolymer having isocyanate groups can be used. Preferably, a polyurethane prepolymer prepared from a polyol having a functionality (the number of hydroxyl groups) of 2.0 to 8 and a molecular weight per hydroxyl group of 300 to 2,000, and having an isocyanato group (—NCO) content of 2 to 30% by weight is used. Ethylene oxide can be added to the polyol in an amount of up to 20% by weight. Many such polyurethane prepolymers are commercially available.

In order to bind fibers 11 substantially only at intersections 12 with resin 13, main body 10 is impregnated with a solution of a polyurethane prepolymer in an organic solvent. The organic solvent to be used herein can be a halogenated hydrocarbon such as trichloroethylene (trichlene), dichloroethylene, trichloroethane, carbon tetrachloride, or ethylene chloride. The polyurethane prepolymer is dissolved in a solvent at a concentration of 1 to 100% by weight and preferably at a concentration of 10 to 70% by weight.

The polyurethane prepolymer solution can also contain a flame-retardant to give the cushion flame-retardant qualities. Liquid flame-retardants that are miscible with the polyurethane prepolymer solution are preferred. Examples of such flame-retardants include phosphoric acid esters (organic phosphates), halogenated phosphoric acid esters (organic phosphates), condensed phosphoric acid esters (organic phosphates), and nitrogen-containing phosphoric acid esters (organic phosphates). They are commercially available. The flame-retardant is added in an amount of 5 to 15 parts by weight and preferably in an amount of about 8 parts by weight based on 100 parts by weight of the polyurethane prepolymer.

In order to impregnate main body 10 with the polyurethane prepolymer solution, it can be dipped in the solution. The prepolymer is preferably contained in an amount of 10 to 70%, preferably 20 to 50%, most preferably 30 to 40% by weight based on the total weight of main body 10. Thereafter, main body 10 must be centrifuged (at a centripetal acceleration rate of, e.g., 50 to 1,000 m/sec$^2$) to remove any excess solution. The centrifugation allows the solution on the exposed surfaces of the fibers to be removed and substantially only the solution at the intersections of the fibers to remain. Thereafter, body 10 is placed in a mold consisting of upper and lower molds of metal nets or punched metals. Body 10 is packed in the mold to a density of, e.g., 0.01 to 0.1 g/cm$^3$, which is the final density of the cushion.

Finally, the polyurethane prepolymer attached to body 10 is brought into contact with water or steam introduced from outside the mold. The water or steam preferably has a temperature of 80° to 130° C. Water or steam is used in an amount not less than the NCO equivalent weight of the polyurethane prepolymer. The reaction between water or steam and the isocyanato groups is fast, and the polyurethane prepolymer can cure within 30 seconds or more. The curing time can be further shortened by adding 10 to 1,000 ppm of an amine such as a tertiary amine (e.g., triethylenediamine or morpholine) to the water or steam.

Cured main body 10 is removed from the mold. Then, as shown in FIG. 1, a cushion is obtained in which the surfaces of fibers 11 are coated with cured polyurethane resin 13 and intersections 12 of fibers 11 are bound by cured polyurethane resin 13. Cured resin 13 is preferably contained in main body 10 in an amount of 20 to 40% by weight based on the total weight of main body 10.

The cured polyurethane resin has a strong adhesive force and excellent heat resistance. According to the present invention, since mainly water is used as a curing agent (cross-linking agent), curing can be performed safely.

EXAMPLE 1

Polyester cotton having a denier of 6 (hollow conjugated type "Esup 6d" available from TOYOBO CO., LTD.) was impregnated with an excessive amount of a solution (prepolymer concentration: 1 to 70% by weight) of a polyurethane prepolymer (having an NCO% of 5%±0.2% and prepared from polyol "MN3050" and toluene diisocyanate "T-80" available from Mitsui Toatsu Chemicals, Inc.) in trichlene. The cotton was centrifuged to remove any excess solution and was placed in a mold at a predetermined density. In this case, the weight ratio of cotton to polyurethane prepolymer was about 7:3. The centripetal acceleration rate was about 50 to 1,000 m/sec$^2$. If it is desirable to change the hardness of any portion of the cushion, the cotton density or prepolymer content of that portion can be changed.

Water or steam (at 80° to 130° C.) in an amount not less than the NCO equivalent amount of the polyurethane prepolymer was blown into the polyester cotton in the mold for 3 minutes. The polyurethane prepolymer was thus cured and the body was removed from the mold to provide the cushion of Example 1.

EXAMPLE 2

5 to 15 parts (preferably about 8 parts) of a liquid flame-retardant ("Thermolin 101", available from Asahi Glass Co., Ltd.) were added to 100 parts of a trichlene solution of the same polyurethane prepolymer as in Example 1. As in Example 1, polyester cotton was impregnated with an excessive amount of the resultant solution. The cotton was centrifuged to remove any excess solution and was placed in a mold at a predetermined density.

Water or steam at 80° to 130° C. in an amount not less than the NCO equivalent amount was blown into the polyester cotton in the mold for 3 minutes to cure the polyurethane prepolymer. The body was removed from the mold to provide the cushion of Example 2.

COMPARATIVE EXAMPLE 1

A polyurethane raw material (formulation in Table 1) was prepared which consisted of a polyether polyol having a molecular weight of 3,000 and a functionality of 3, toluene diisocyanate (T-80), water as a foaming agent, and other additives. After mixing the material with a mixing head, it was injected into a warm mold in a predetermined amount, and the mold was closed. The mold was heated at 170° C. for 10 minutes (5 minutes for the HR foam) to cure the foam. The foam was then removed from the mold. If a flame-retardant is added, it is to be added in an amount of 10 to 20 parts.

TABLE 1

| (Polyurethane Foam Formulation) | | |
|---|---|---|
| | Mold Foam (parts by weight) | |
| Polyol | EP551 | 100 |
| | (Mitsui Toatsu Chemicals, Inc.) | |
| Foaming agent | Water | 3.6 |
| Catalyst | Dubco 33LV | 0.25 |
| | (Sankyo Air Products K.K.) | |
| | Stannous octate | 0.15 |
| | (Yoshitomi Pharmaceutical Industries, Ltd.) | |
| Foam Stabilizer | L-520 | 1.5 |
| | (Nihon Unikah K.K.) | |
| Isocyanate | T-80 | 45.7 |
| | (Mitsui Toatsu Chemicals, Inc.) INDEX 105 | |
| Foaming agent | Freon 11 | 5 to 15 |
| | (Asahi Glass Co., Ltd.) | |
| (Flame-retardant) | Thermolin 101 | 15 |
| | (Asahi Glass Co., Ltd.) | |

Referring to Table 1, "EP 551" has a functionality of 3, and a molecular weight of 3,000.

COMPARATIVE EXAMPLE 2

Latex was sprayed onto unbound palm fibers which were then compressed to a predetermined thickness and dried with hot air at 120° C. The compressed body was cut to a predetermined size. The cut body was placed in a mold and was again sprayed with latex. After the mold was closed, the body was dried with heated air at 120° C. The dried body was removed from the mold to provide palmrock.

In the obtained palmrock, fibers 50 were bound with latex 51, as shown in FIG. 5.

COMPARATIVE EXAMPLE 3

Low-melting point binder fibers (4d; melting point: 110° C.) were mixed and unbound with polyester cotton (6d; hollow conjugated type) in a weight ratio of 7:3. The mixture was formed into a sheet having a thickness of 20 mm. The sheet was placed in a mold at a specific density. After closing the mold, the binder resin was melted by heated air at a temperature higher than the melting point of the resin. After the resin was solidified upon cooling, the body was removed from the mold to obtain a cotton cushion.

In the cushion of Comparative Example 3, as shown in FIG. 6, only low-melting point binder resin 60 is bound, and polyester cotton 61 is mixed with this matrix.

Various properties of the cushions in Examples 1 and 2 and Comparative Examples 1 to 3 are shown in Table 2 below. Table 3 shows properties and pad performance (experimental values) of the prepolymers which can be used in the present invention. FIG. 4 shows the relationship between density and hardness in the cushions of Examples 1 and 2 and Comparative Examples 1 to 3.

TABLE 2

|  | Example 1 | Example 2 | Comparative Example 1 (Polyurethane Foam) Flexible Foam | Comparative Example 1 (Polyurethane Foam) HR Foam | Comparative Example 2 (Palmrock) | Comparative Example 3 (Cotton Cushion) |
| --- | --- | --- | --- | --- | --- | --- |
| Density (g/cm$^3$) | 0.015 to 0.060 | 0.015 to 0.060 | 0.026 to 0.050 | 0.040 to 0.060 | 0.060 to 0.200 | 0.020 to 0.060 |
| Compression strength (kg/314 cm$^2$) | 4 to 60 | 3.5 to 55 | 6 to 30 | 10 to 30 | 8 to 40 | 8 to 40 |
| Ball rebound (%) | 60 | 60 | 40 | 60 | 55 | 55 |
| Repeated 50% deflection, 80000 cycle compression set (%) | 4 | 4 | 3 | 3 | 10 | 10 |
| 70° C., 50% compression set (%) | 15 | 15 | 8 | 6 | 20 | 40 |
| Air permeability (cc/cm$^2$/sec) | 200 or more | 200 or more | 20 to 100 | 5 to 20 | 300 or more | 200 or more |
| Local hardness change | Possible | Possible | Impossible | Impossible | Possible | Possible |
| Hardening time (cycle time) | 4 min. | 3 min. | 10 min. | 5 min. | 7 min. | 7 min. |
| Combustion Test |  |  |  |  |  |  |
| For automobiles MVSS 302 Para. | Flame-retardant | Flame-retardant | Flame-retardant | Semi flame-retardant | Semi flame-retardant to fire retardant | Flame-retardant |
| For aircraft (1) | Combustible | Self-extinguishing | Self-extinguishing | Self-extinguishing | Combustible | Self-extinguishing |
| For railroad vehicles (2) | Flame-retardant | Flame-retardant | Flame-retardant* | Flame-retardant* | Combustible | Flame-retardant |

(1) Test according to Appendix F, Section 11 of Procedures for Testing Aircraft
(2) Combustion Test by Senpaku Gijutsu Kenkyusho
Note* Each polyurethane foam tested contains a different content (parts) of flame-retardant. Polyurethane foams containing no flame-retardant are combustible.

TABLE 3

|  | Prepolymer (polyol) | | | | | | |
| --- | --- | --- | --- | --- | --- | --- | --- |
|  | MN1000 | MN1500 | MN1500 | MN1500 | MN3050 | EP550N | CP560 |
| polyol structure |  |  |  |  |  |  |  |
| Functionality | 3 | 3 | 3 | 3 | 3 | 3 | 6 |
| Molecular weight | 1000 | 1500 | 1500 | 1500 | 3000 | 3000 | 6000 |
| Remarks |  |  |  |  |  | Terminal E.O. added (increased reactivity) |  |
| Properties of prepolymer prepared from T-80 |  |  |  |  |  |  |  |
| NCO % | 5.0 | 7.4 | 5.0 | 2.8 | 4.9 | 4.9 | 5.1 |
| Viscocity CP (at 23° C.) | Gelled | 34500 | 151000 | Gelled | 5840 | 6310 | 13500 |

TABLE 3-continued

| | Prepolymer (polyol) | | | | | | |
|---|---|---|---|---|---|---|---|
| | MN1000 | MN1500 | MN1500 | MN1500 | MN3050 | EP550N | CP560 |
| Pad properties | | | | | | | |
| Hardness (kg/314 cm$^2$) at 0.025 g/cm$^3$ densitiy | 18.8 | 21.1 | 18.2 | 15.2 | 18.5 | 17.8 | 18.0 |
| Ball rebound (%) | 51 | 60 | 57 | 53 | 60 | 58 | 61 |
| 70° C., 50% compression set (%) | 18 | 18 | 16 | 15 | 15 | 15 | 15 |
| Repeated 50% deflection, 80000 cycle compression set (%) | 5 | 5 | 4 | 4 | 4 | 4 | 4 |

EXAMPLE 3

Using fibers of 6 denier and 38 denier, cushions were prepared under the same conditions as in Example 1. The properties of the cushions are shown in Table 4 below.

TABLE 4

| | Denier of Fiber | | | |
|---|---|---|---|---|
| | 6 | | 38 | |
| | Sample No. | | | |
| | 1 | 2 | 3 | 4 |
| Density Kg/m$^3$ | 20.3 | 24.3 | 20.5 | 25.3 |
| Hardness | 2.5 | 4.6 | 2.0 | 3.0 |
| Hardness/Density | 125 | 189 | 98 | 118 |
| Change rate in Hardness (%) | 13 | 20 | 21 | 22 |
| Change rate in Distortion (%) | 12 | 14 | 29 | 19 |
| Appearance | Good | | Fibers tend to be untied | |

EXAMPLE 4

Various properties of a cushion of the invention (size: 500 mm × 500 mm × 100 mm) prepared according to the procedures in Example 1 were measured. As a comparison, a cushion having the same size was prepared by crimping fibers of 300 denier, dipping the crimped fiber in a polyurethane prepolymer solution, removing solution only by the gravity without centrifugation, and steam-curing the fiber. The results are shown in FIGS. 7 to 12, in which curve a denotes the invention and curve b denotes the comparison.

Figure 7:
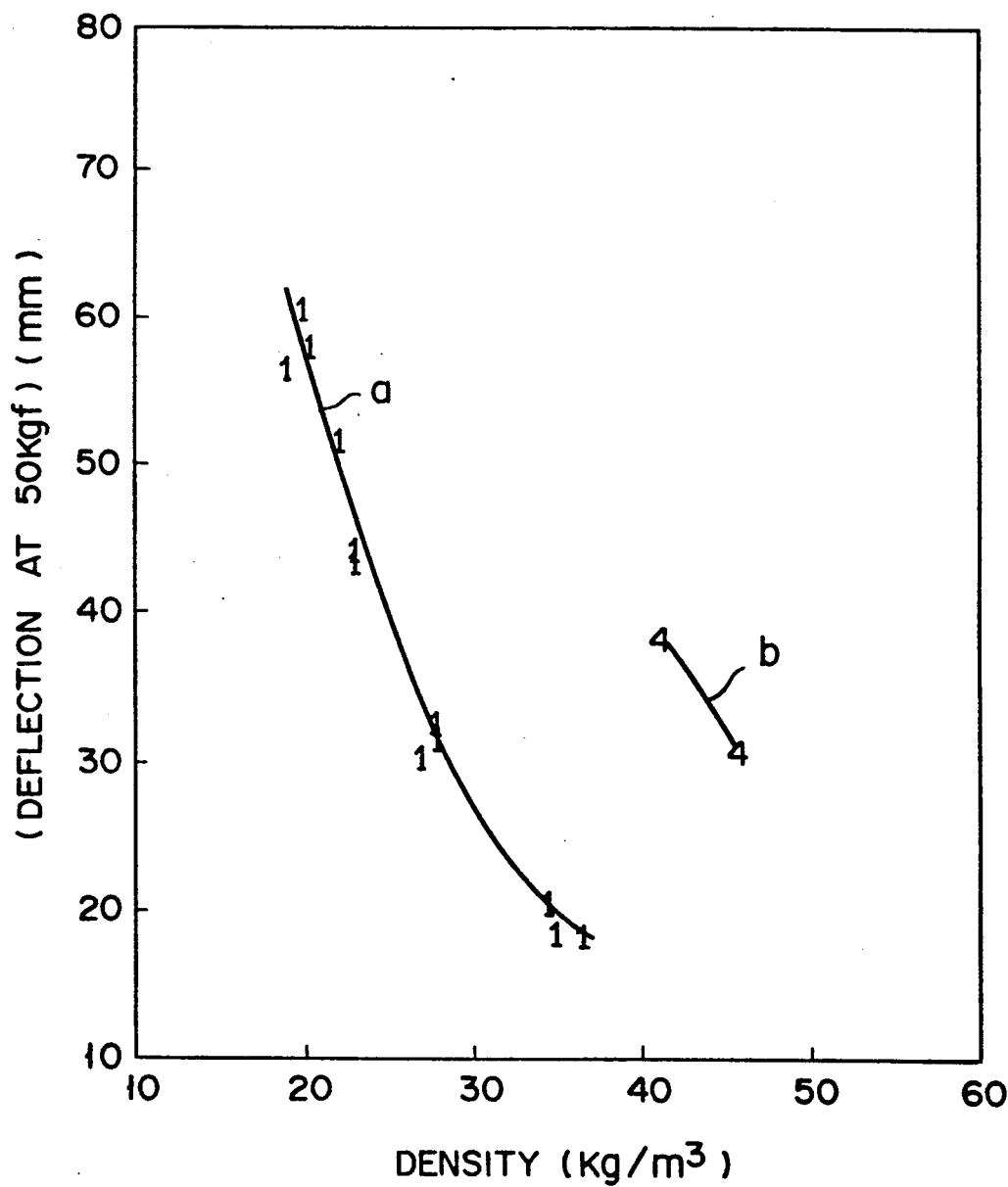
FIGS. 7 to 12 are graphs showing the properties of the cushion of the invention together with those of a comparative cushion.

FIG. 7 shows the relationship between the density (kg/m$^3$) and the deflection at 50 kgf (mm). It is seen that the cushion of the invention is smaller in density than the comparison at the same level of deflection.

Figure 8:
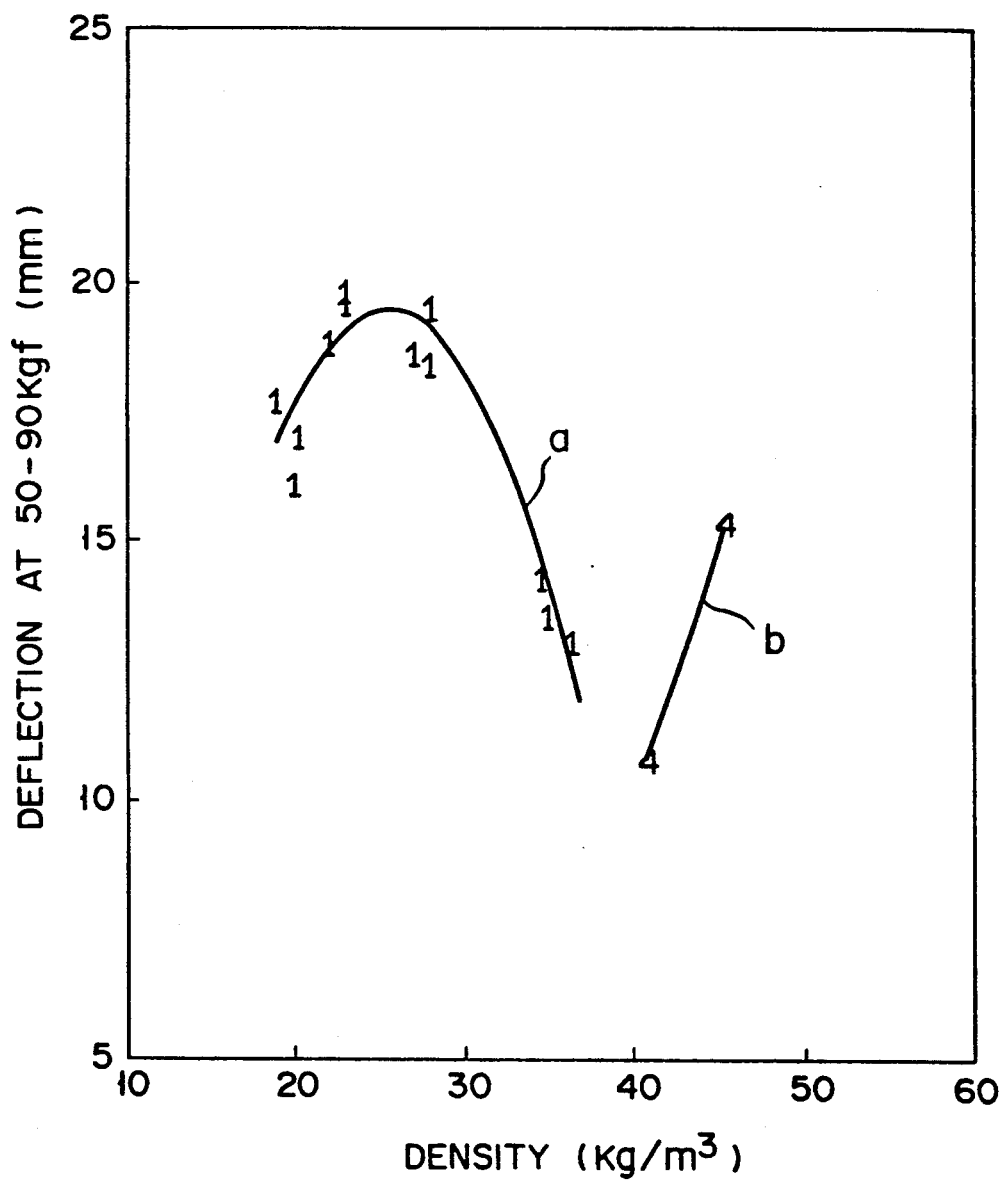

FIG. 8 shows the relationship between the density (kg/m$^3$) and the deflection at 50-90 kgf (mm). The larger the deflection difference, better the sitting comfortability. It is seen that the deflection difference is larger in the cushion of the invention than in the comparison, indicating that the cushion of the invention is better in the sitting comfortability than the comparison.

Figure 9:
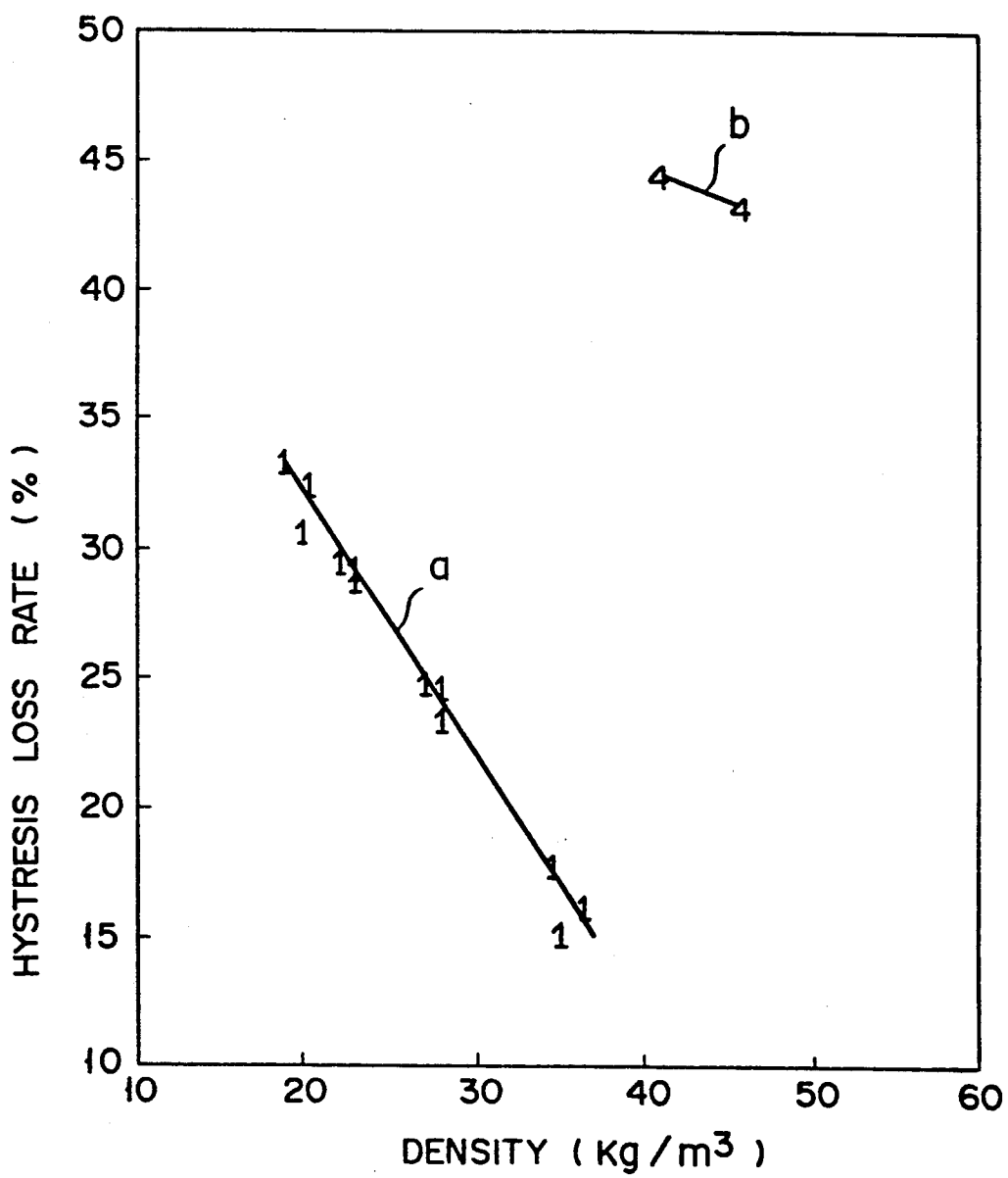

FIG. 9 shows the relationship between the density (kg/m$^3$) and the hysteresis loss rate. The smaller the rate, the better the sitting comfortability.

Figure 10:
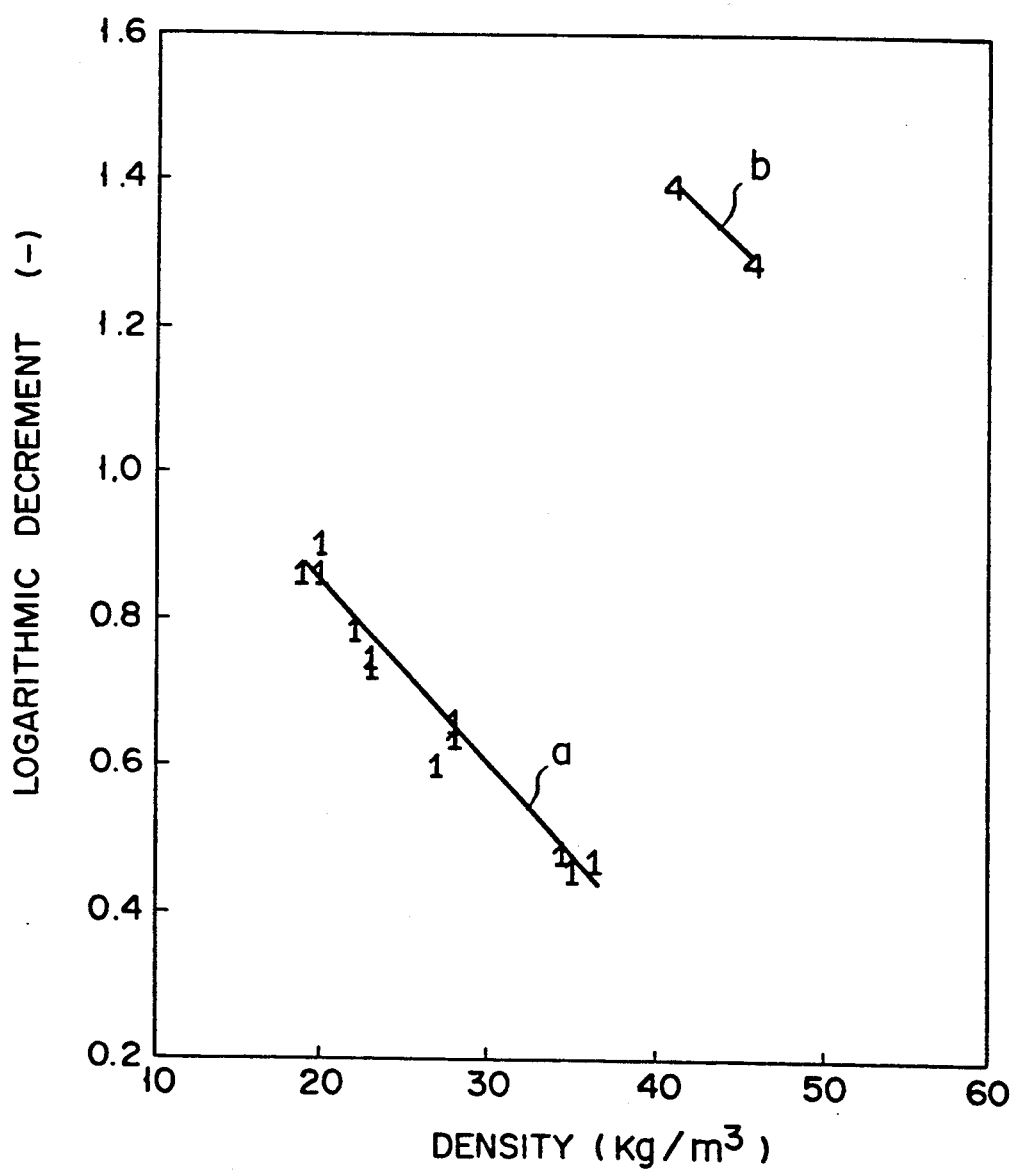

FIG. 10 shows the relationship between the density and the logarithmic decrement.

Figure 11:
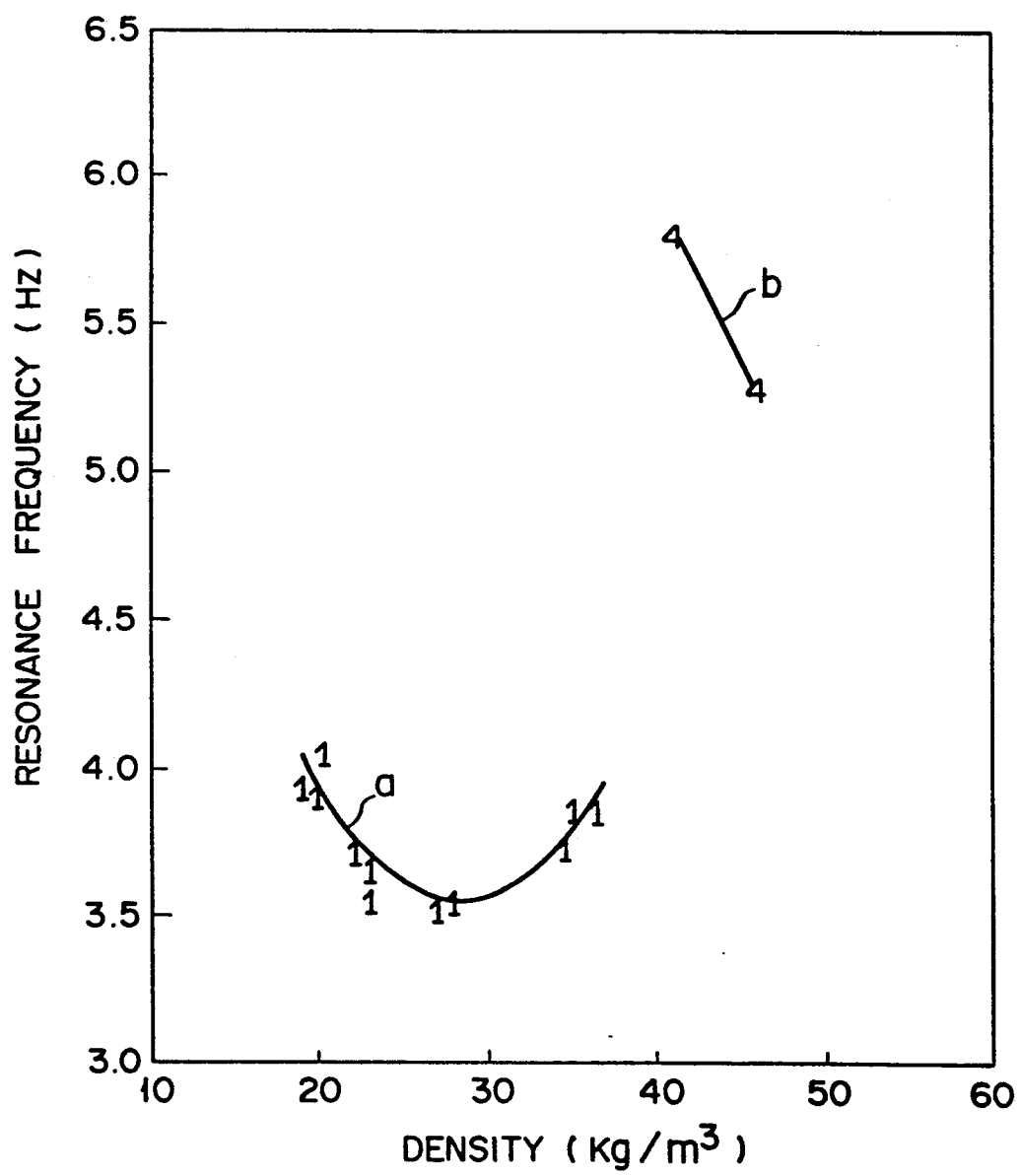

FIG. 11 shows the relationship between the density and the resonance frequency. It is desired that the frequency is low, and is 4.0 Hz or less for a motorcar for riding or passenger car.

Figure 12:
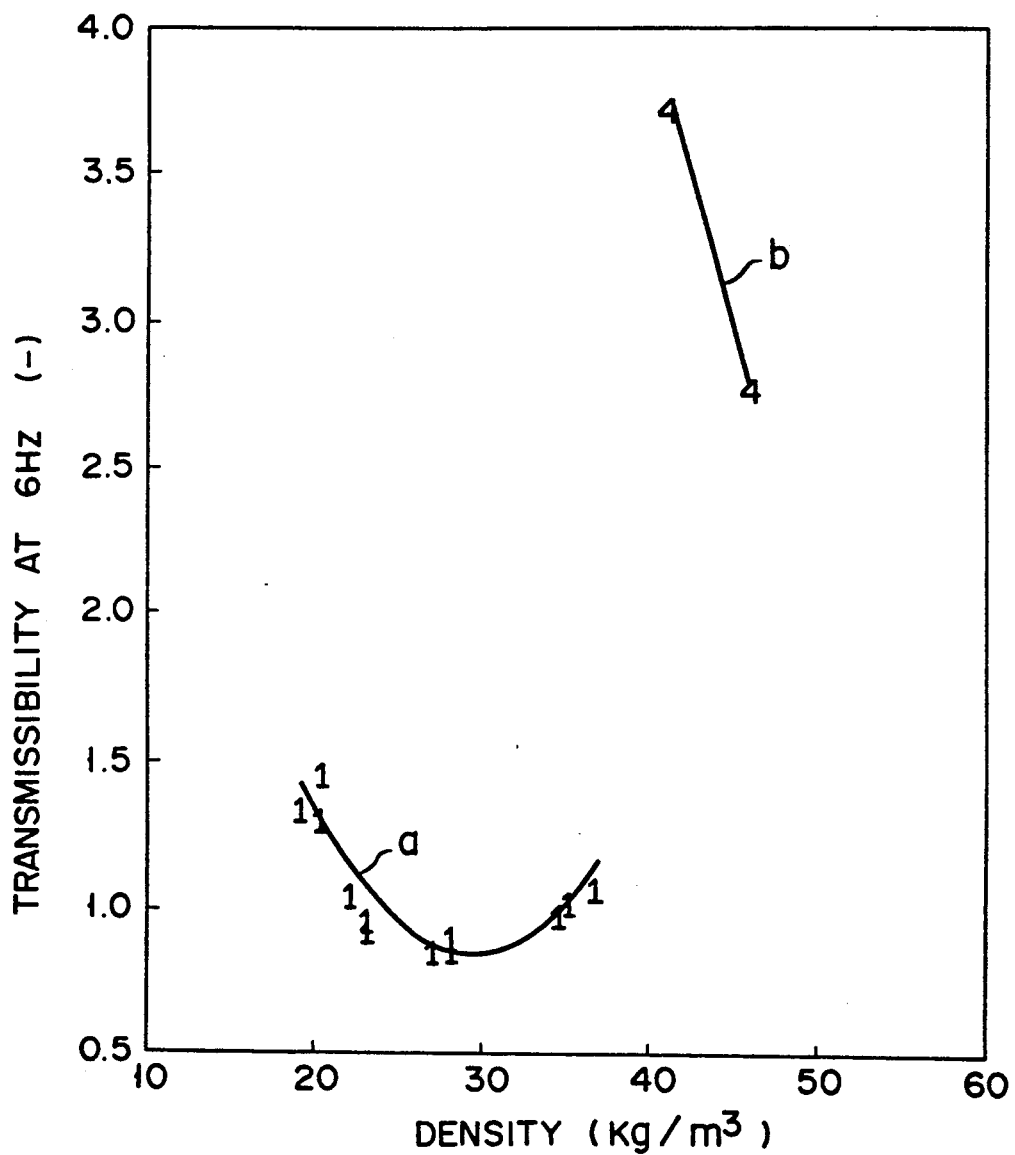

FIG. 12 shows the relationship between the density and the transmissibility at 6 Hz. It is desired that the transmissibility is lower for the sitting comfortability to suppress unpleasantness and improve the sitting comfortability since the resonance point in human body is at about 5 to 6 Hz.

As described above, according to the present invention, cushions are obtained which are lighter than conventional cushions, have excellent air permeability, do not easily collapse, and provide excellent seating comfort. These advantages are obtained in the invention because a fine fiber of 1 to 20 denier is used and the centrifugation is applied to remove excess polyurethane as a binder, thereby binding the fiber substantially only at the intersections. Both the manufacturing equipment and molds and the manufacturing procedures are simple, there is no fear of pollution, and manufacturing costs are low.

What is claimed is:

1. A method of manufacturing a cushion, comprising the steps of:
    impregnating a main body, comprising organic synthetic fibers having a denier of 1–20 and which are stereoscopically intertwined, with a polyurethane prepolymer solution so as to allow the polyurethane prepolymer to attach to the fibers;
    centrifuging the cushion body to remove excess solution from the cushion body; and
    curing the polyurethane prepolymer by bringing the polyurethane prepolymer attached to the fibers into contact with a curing agent comprising water.

2. A method according to claim 1, wherein the polyurethane prepolymer is prepared from a polyol having a functionality of 2.0 to 8 and a molecular weight per hydroxyl group of 300 to 2,000, and has an isocyanato group content of 2 to 30% by weight.

3. A method according to claim 1, wherein the polyurethane prepolymer solution contains the polyurethane prepolymer at a concentration of 1 to 100% by weight.

4. A method according to claim 1, wherein the polyurethane prepolymer solution further contains a flame-retardant.

5. A method according to claim 1, wherein the curing agent is at a temperature of 80° to 130° C.

6. A method according to claim 1, wherein the curing agent further contains an amine.

7. A method according to claim 1, wherein centrifugation is performed at a centripetal acceleration rate of 50 to 1,000 m/sec$^2$.

8. A method according to claim 2, wherein:
    the polyurethane prepolymer solution contains the polyurethane prepolymer at a concentration of 1 to 100% by weight;
    the curing agent is at a temperature of 80° to 130° C.; and
    the centrifugation is performed at a centripetal acceleration rate of 50 to 1,000 m/sec$^2$.

9. A method according to claim 1, wherein the polyurethane prepolymer solution contains the polyurethane prepolymer at a concentration of 10 to 70% by weight.

10. A method according to claim 1, wherein the main body, after said impregnation with the polyurethane prepolymer solution, contains the polyurethane prepolymer in an amount of 10 to 70% by weight.

11. A method according to claim 1, wherein the main body, after said impregnation with the polyurethane prepolymer solution, contains the polyurethane prepolymer in an amount of 30 to 40% by weight.

12. A method according to claim 1, wherein the curing agent comprises steam in an amount not less than the NCO equivalent weight of the polyurethane prepolymer.

13. A method according to claim 2, wherein:
the polyurethane prepolymer solution contains the polyurethane prepolymer at a concentration of 10 to 70% by weight;
the main body, after said impregnation with the polyurethane prepolymer solution, contains the polyurethane prepolymer in an amount of 10 to 70% by weight;
the curing agent comprises steam in an amount not less than the NCO equivalent weight of the polyurethane prepolymer; and
the centrifugation is performed at a centripetal acceleration rate of 50 to 1,000 m/sec$^2$.

14. A method according to claim 13, wherein the polyurethane prepolymer solution further contains a flame-retardant in an amount of 5 to 15 parts by weight based on 100 parts by weight of the polyurethane prepolymer.

15. A method according to claim 13, wherein the curing agent further contains 10 to 1,000 ppm of a tertiary amine.

16. A method according to claim 1, wherein the polyurethane prepolymer solution comprises 10 to 70% by weight of the polyurethane prepolymer dissolved in a halogenated hydrocarbon.

17. A method according to claim 1, wherein the polyurethane prepolymer solution comprises 10 to 70% by weight of the polyurethane prepolymer dissolved in an organic solvent selected from the group consisting of trichloroethylene, dichloroethylene, trichloroethane, carbon tetrachloride, and ethylene chloride.

18. A method according to claim 1, wherein the polyurethane prepolymer solution further contains a liquid flame-retardant that is miscible with the polyurethane prepolymer solution and that is selected from the group consisting of phosphoric acid esters, halogenated phosphoric acid esters, condensed phosphoric acid esters, and nitrogen-containing phosphoric acid esters.

19. A method according to claim 1, wherein the curing agent further contains 10 to 1,000 ppm of a tertiary amine selected from the group consisting of triethylenediamine and morpholine.

20. A method according to claim 1, wherein:
the polyurethane prepolymer is prepared from a polyol having a functionality of 2 to 8 and a molecular weight per hydroxyl group of 300 to 2,000, and has an isocyanato group content of 2 to 30% by weight;
the polyurethane prepolymer solution comprises 10 to 70% by weight of the polyurethane prepolymer dissolved in an organic solvent selected from the group consisting of trichloroethylene, dichloroethylene, trichloroethane, carbon tetrachloride, and ethylene chloride, the polyurethane prepolymer solution further containing a liquid flame-retardant that is miscible with the polyurethane prepolymer solution and that is selected from the group consisting of phosphoric acid esters, halogenated phosphoric acid esters, condensed phosphoric acid esters, and nitrogen-containing phosphoric acid esters;
the main body, after said impregnation with the polyurethane prepolymer solution, contains the polyurethane prepolymer in an amount of 10 to 70% by weight;
the curing agent comprises steam in an amount not less than the NCO equivalent weight of the polyurethane prepolymer and further contains 10 to 1,000 ppm of a tertiary amine selected from the group consisting of triethylenediamine and morpholine; and
the centrifugation is performed at a centripetal acceleration rate of 50 to 1,000 m/sec$^2$.

* * * * *